United States Patent
Karol et al.

(10) Patent No.: US 7,188,189 B2
(45) Date of Patent: Mar. 6, 2007

(54) SYSTEM AND METHOD TO IMPROVE THE RESILIENCY AND PERFORMANCE OF ENTERPRISE NETWORKS BY UTILIZING IN-BUILT NETWORK REDUNDANCY

(75) Inventors: Mark J. Karol, Fair Haven, NJ (US); P. Krishnan, North Plainfield, NJ (US); Juan Jenny Li, South Orange, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 595 days.

(21) Appl. No.: 10/406,096

(22) Filed: Apr. 2, 2003

(65) Prior Publication Data

US 2004/0199662 A1    Oct. 7, 2004

(51) Int. Cl.
    *G06F 15/16* (2006.01)
(52) U.S. Cl. ...................... 709/238; 370/351
(58) Field of Classification Search ........ 709/200–203, 709/217–224, 235–238; 370/218, 237, 356, 370/394, 473, 351
    See application file for complete search history.

(56) References Cited

U.S. PATENT DOCUMENTS

| | | | | |
|---|---|---|---|---|
| 5,457,678 A | * | 10/1995 | Goeldner | 370/395.2 |
| 6,167,051 A | * | 12/2000 | Nagami et al. | 370/397 |
| 6,327,275 B1 | * | 12/2001 | Gardner et al. | 370/535 |
| 6,466,574 B1 | * | 10/2002 | Fujisaki et al. | 370/356 |
| 6,751,746 B1 | * | 6/2004 | Jain et al. | 714/4 |
| 2003/0046032 A1 | * | 3/2003 | Puthiyedath | 702/188 |
| 2003/0048782 A1 | * | 3/2003 | Rogers et al. | 370/389 |
| 2004/0062248 A1 | * | 4/2004 | Nagarajan et al. | 370/394 |

OTHER PUBLICATIONS

"Users Find a Smarter Way to Route" by T. Greene, NetworkWorld ((www.nwfusion.com), Jul. 22, 2002, p. 7).
"Multiprotocol Label Switching Architecture" by E. Rosen, A. Viswanathan, and R. Callon (IETF RFC 3031).
"SIP: Session Initiation Protocol" (IETF RFC 3261, Jun. 2002).

* cited by examiner

*Primary Examiner*—Moustafa M. Meky
(74) *Attorney, Agent, or Firm*—McGrath, Geissler, Olds & Richardson, PLLC

(57) ABSTRACT

The present invention is a system and method to improve the reliability and performance of existing enterprise IP networks which have dual-homed (or multi-homed) network architectures. In one aspect of the invention packets related to a selected category of transmission (e.g., VoIP) are duplicated at an edge router and sent over both (multiple) service providers. After traversing the service provider networks, only the first-to-arrive packets are kept and the later-arriving copies are discarded. In so doing, the result is better protection against node failures, link failures, and packet errors, and also better QoS performance under normal (fault-free) operation.

12 Claims, 4 Drawing Sheets

SYSTEM AND METHOD TO IMPROVE THE RESILIENCY AND PERFORMANCE OF ENTERPRISE NETWORKS BY UTILIZING IN-BUILT NETWORK REDUNDANCY

FIELD OF THE INVENTION

The present invention relates to the transmission of real-time traffic on Internet Protocol (IP) networks wherein packets are duplicated and then sent over mostly different paths to their destination.

BACKGROUND OF THE INVENTION

Many real-time applications, such as Voice over IP (VoIP), demand underlying infrastructures to both be reliable and provide acceptable quality-of-service (QoS). Ideally, converged IP networks (which simultaneously carry voice and data traffic) will be made as reliable as their circuit-based voice counterparts, despite the inherent limitations of IP networks. To attain this goal, protection is needed against network (hardware and software) failures, as well as appropriate forms of "QoS protection" against the inevitable losses and delays that occur in IP networks. VoIP is particularly vulnerable to such adverse performance occurrences. For example, link and router failures may be followed by long periods of routing instability and packet loss, which can heavily compromise the quality of VoIP. Even on good paths, rare loss events can occasionally cause perceptible degradation of voice quality.

There have been recent attempts in the network communications art to improve the reliability (hardware and software), performance (delay, jitter, and packet loss), and QoS characteristics of IP service provider networks. Multi-protocol label switching (MPLS) is one technique that has been investigated. An example of this technique is described in a paper entitled "Multiprotocol Label Switching Architecture" by E. Rosen, A. Viswanathan, and R. Callon (IETF RFC 3031), which is hereby incorporated by reference. MPLS provides the ability to separate routing from forwarding and assign incoming packets a label at a label edge router (LER). Packets are then forwarded along a label switch path (LSP) where forwarding decisions are based solely on the contents of the label. This provides for, among other things, path protection mechanisms that provide fail-over and redundancy, and traffic engineering capabilities (e.g., appropriate paths through the network can be selected to achieve desired performance characteristics for various traffic classes).

While such prior art improvements show promise in improving the reliability and performance of service provider (SP) networks, it is unclear how soon the various proposed techniques will be widely available to individual enterprise customers—and at what prices. Further, an enterprise may not want to depend solely on the "guarantees" of a single SP (e.g., in its disaster recovery planning). In addition, it is likely that many enterprise customers will desire connections to multiple service providers. Such a multi-homed configuration helps an enterprise maintain high availability and retain some control over its own network's protection.

One variation of a multi-homed configuration is a dual-homed configuration wherein typically in the prior art, the second service provider is just used as a backup for the primary service provider. In the event of a failure, the enterprise edge router, for example, simply diverts its traffic to the backup (secondary) service provider network. Sometimes, the enterprise network may use a portion of its link to the secondary service provider to carry some traffic. Usually, service providers have a fixed charge for the link from the enterprise to the service provider.

Some recent improvements in the prior art utilize "smart routing" techniques in dual-homed architectures, an example of which technique is described in an article entitled "Users Find a Smarter Way to Route" by T. Greene, appearing in NetworkWorld ((www.nwfusion.com), 22 Jul. 2002, p. 7), and incorporated herein by reference. In such a technique, even when there aren't any failures, both service provider networks might be used to carry the enterprise's traffic: some flows are sent over the first SP and some flows are sent over the second SP. By way of example, a "smart" edge router might send test/probe packets across a set of possible routes and then use route-control software to select a particular "best" route (based on the measured performance of each SP). The selected SP (and route) can change after each probe/measurement of network conditions, and the selection can be based on a given cost function. This is in contrast with common prior art routing schemes that often pick routes just to minimize the number of hops—not necessarily considering the best performance or the minimum cost.

With smart routing technology though, there are several issues to consider in its implementation. First, there is the challenge and complexity of determining the best route. Second, it is unclear how well the past measurements will accurately predict the future network conditions. Further, how often do the network conditions need to be monitored and the measurements updated? The minimum recovery time from one failed path to a new path is the same as the probing frequency, which is often over 5 minutes and unacceptable for real-time traffic.

The present invention relates to improvements in the prior art that help enterprises deal with the failures, losses, and delays that occur in SP networks. In particular, the preferred embodiment of the present invention incorporates a form of "service-aware routing" that duplicates certain packets (e.g., VoIP) for simultaneous transmission to multiple WAN links, e.g. multiple service providers. After traversing the service provider networks, only the first-to-arrive packets are kept and the later-arriving copies are discarded. Consequently, the present invention helps reduce the impact of WAN or SP failures, losses, and delays on real-time applications such as VoIP. The present invention works also on multiple LAN links.

SUMMARY OF THE INVENTION

The present invention is a system and method to improve the reliability and performance of existing enterprise IP networks which have dual-homed (or multi-homed) network architectures. In one embodiment of the invention certain packets (e.g., VoIP) are duplicated at, for example, one edge router and sent over both (multiple) WAN links or service providers. After traversing the service provider networks, only the first-to-arrive packets are kept and the later-arriving copies are discarded. In so doing, the result is better protection against node failures, link failures, and packet errors, and also better QoS performance under normal (fault-free) operation. The packet-duplication process can be policy-based and take into account costs, bandwidth, and priority issues.

DETAILED DESCRIPTION

The present invention is a system and method to improve the reliability and performance of enterprise communications on existing IP networks. This is achieved even though an enterprise may not have any (or very limited) control over what happens inside and what decisions are made inside the service provider portion of the network. The technique exploits the fact that many enterprises have or will have dual-homed (or multi-homed) network architectures. The following discussion concentrates on dual-homed enterprises and VoIP applications. The invention is not so limited as the technique has potential benefits for other types of network traffic as well.

Figure 1:
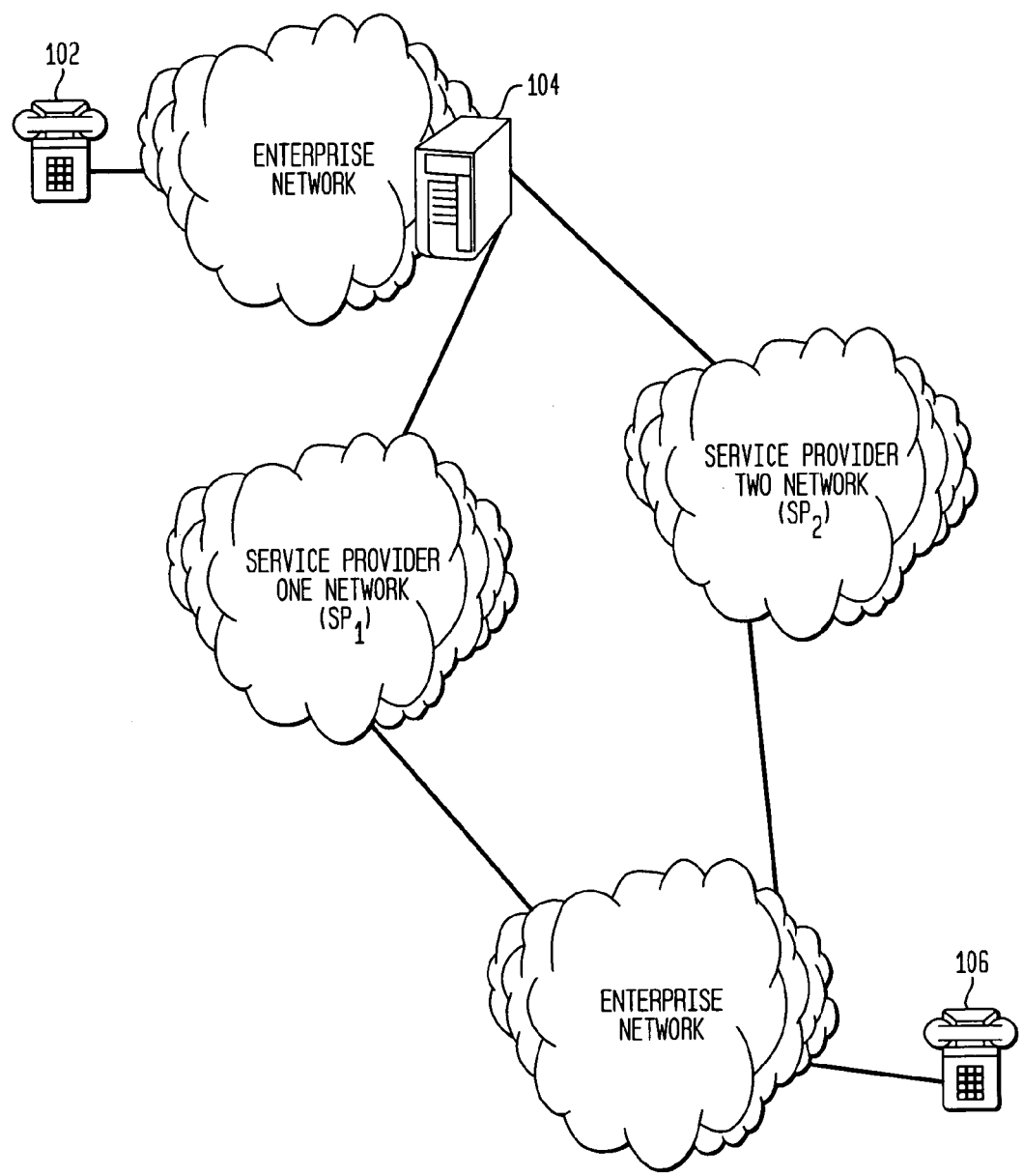
FIG. 1 depicts an example of a dual-homed enterprise network.

An illustrative example of such a dual-homed enterprise network is depicted in FIG. 1. As depicted, a communication link is established from a calling IP phone 102, through an edge-router 104 to a called phone 106. The depicted enterprise network comprises two service provider networks. Typically, in the prior art one of these alternative service provider networks is selected to transmit a given packet of information.

Figure 2:
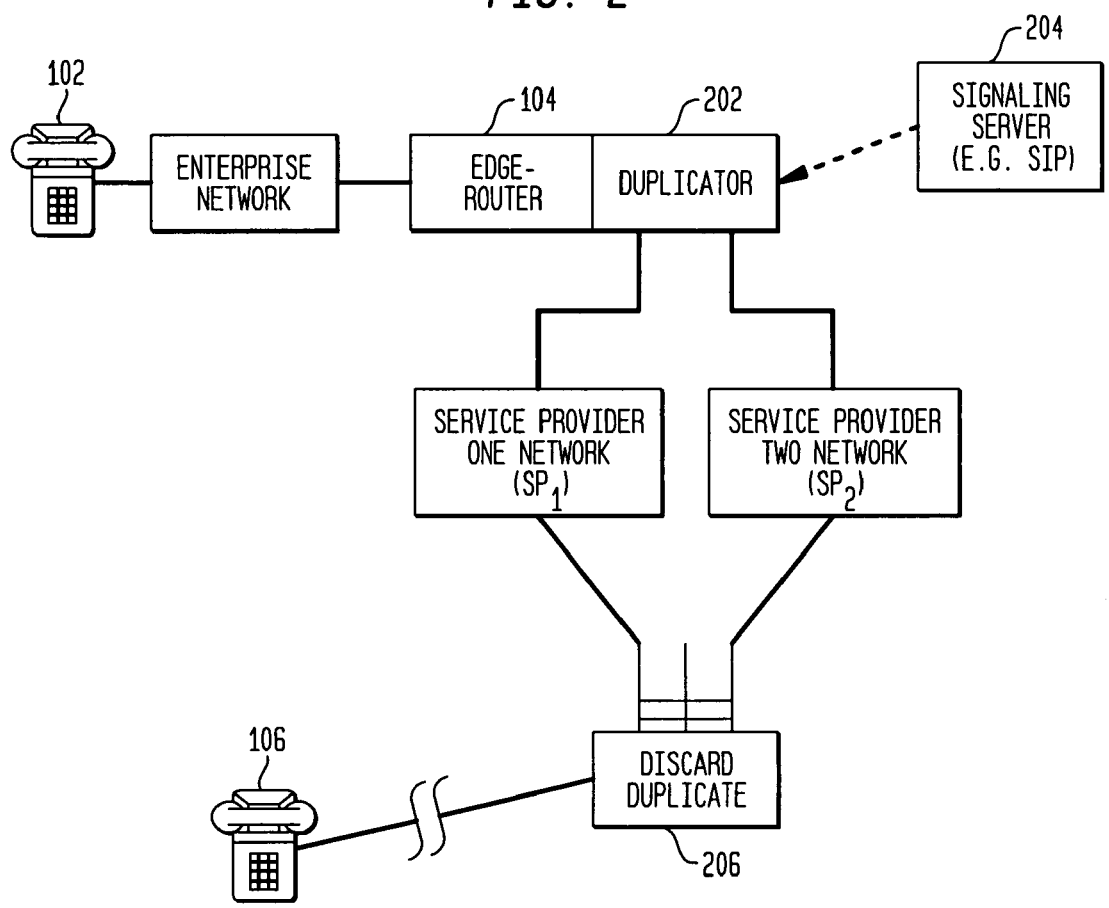
FIG. 2 illustrates an embodiment of the invention where duplicating and discarding of packets occurs.

In the preferred embodiment of the invention, a form of service-aware routing is utilized. That is, high priority packets (e.g., VoIP) are duplicated at, for example, one edge router so that they can be sent over both service providers $SP_1$ and $SP_2$ as depicted in FIG. 2. The packet-duplication process can be done selectively so that not all packets are duplicated and this process can take into account costs, bandwidth, and priority issues. After traversing the service provider networks, one copy of the duplicated packets is deleted at, for example, the edge router at the remote end. In alternative embodiments, this deletion function can be performed by a gateway, switch, or a module added to an existing edge router, gateway or switch. In this manner the invention realizes the performance benefits associated with keeping the first-to-arrive packet and later dropping the duplicate (second-to-arrive) packet. Sometimes the first-to-arrive packet will reach the remote edge router through service provider $SP_1$. At other times, due to changing conditions, the first copy of a packet will reach the remote edge router through service provider $SP_2$.

It should be noted that the invention is not limited to the transmission of duplicate packets over two separate service providers. Alternative embodiments of the invention include the use of two or more wide area networks (WAN's) or even the use of different tunnels over the same service provider. The present invention is applicable to any network system where two or more separate paths can be established. Further, the present invention does not require additional control over the transmitted duplicate packets along those paths.

Quality-of-service issues are especially important for real-time traffic. Since VoIP applications have relatively low bandwidth requirements, but are very sensitive to both loss and jitter, the present invention is particularly relevant to VoIP streams. The technique is, in principle, similar to "1+1" based duplication (e.g., MPLS 1+1 protection schemes), but is applicable over standard IP infrastructures (i.e., works with standard IP routers and does not require special label forwarding MPLS routers), and is deployable at the enterprise edge (or further inside the enterprise), hence, increasing reliability coverage closer to the edge. As depicted in FIG. 2, the performance improvement (reduced delay, jitter, and packet loss) is attained simply by adding one "duplication box" 202 at the "source" enterprise edge to the service provider networks (or closer to the traffic sources). FIG. 2 further illustrates adding one "discard box" 206 to eliminate, if desired or necessary, some of the increased receiver-side enterprise traffic load near the "destination" enterprise edge to the service provider networks. In alternative embodiments of the invention it is envisioned that the end-hosts themselves would drop duplicates per RTP specifications (and that a "discard box" is not required).

Several items should be noted with respect to the embodiment of the invention depicted in FIG. 2. First, the sending and receiving sides do not need to cooperate with each other and there is no need to change the client applications. Second, the scheme as described only exploits dual homing at the sending side. If the sending and receiving edge routers are both dual-homed and can in fact cooperate with each other, more benefits are possible. That is, the implementation of the invention can be adapted to take this capability into account. For instance, cooperating enterprise locations can achieve additional benefits by encapsulating and sending packets across essentially non-overlapping paths. Thus, for example, changing appropriate header information would result in duplicate packets being transmitted across different tunnels of the same service provider.

The present invention attains the benefits of duplicate packet transmissions while working with existing networks and deployments without requiring all routers to be upgraded (e.g., like in MPLS). These benefits include better protection against link failures and node failures since more of the end-to-end path is protected. Further, the present invention provides additional protection against packet errors. Specifically, if a particular packet suffers errors (or is unreadable) and needs to be dropped somewhere in the network, there still is a good chance that another copy of the packet will not have errors (and can be retained). Furthermore, because the destination edge router can always make use of the first-to-arrive packets, it thereby attains better QoS performance (e.g., lower delay) even under normal, fault-free operation. Essentially, it helps provide some delay protection against the inevitable and unpredictable congestion that occurs in service provider networks. In addition, when the various SP delay distributions are quite different, the invention's delay performance will be similar to that of an "ideal smart router". Most of the time, the delay will be the same as that of the lowest (propagation) delay SP network. However, when that particular SP network gets congested (or suffers a failure), the invention's delay will automatically shift over to the delay of another (less congested) SP network.

The present invention offers several other benefits as well. Applications do not need to be significantly upgraded, since many applications are resilient to duplicate packets. In particular, these include Real-Time Transport Protocol (RTP) which is used in VoIP applications. In one embodiment of the invention duplicates are simply dropped at an enterprise edge for performance reasons. Consequently, statistics (e.g. numbers of dropped packets) maintained at the application do not get impacted. Deploying the scheme is simplified since it needs to be done at the enterprise edge alone and can be done in an evolutionary way. Thus for example, the invention may be implemented with just real-time, VoIP streams. This simplifies the implementation as it helps keep the table and buffer sizes manageable.

The present invention may be implemented and deployed in a variety of ways. In the embodiment depicted in FIG. 2, a signaling server 204 can be configured to incorporate the duplication capabilities of their enterprise edge routers 104 during call setup. One example of such a signaling server is described in the paper by J. Rosenberg, et al. entitled "SIP: Session Initiation Protocol" (IETF RFC 3261, June 2002) which is hereby incorporated by reference. At the time of call setup such a server would "open up" the relevant RTP ports for duplication at the edge routers. It is well-known in the prior art to do this identification (e.g., SIP-friendly firewalls have the necessary technology). In implementing this embodiment of the present invention, routers would also have to open up some duplication Application Program Interfaces (APIs), or alternatively a proxy configuration tool could be employed. In an alternative embodiment of the invention, the capability can be bundled into enterprise-edge routers. Such a bundling would be practical depending on the volume of signaling messages expected. Alternative embodiment of the invention can be deployed with existing Network Address Translation (NAT) and firewalls even when the enterprise edge routers are not co-located.

I. Prototype Implementation

Figure 3:
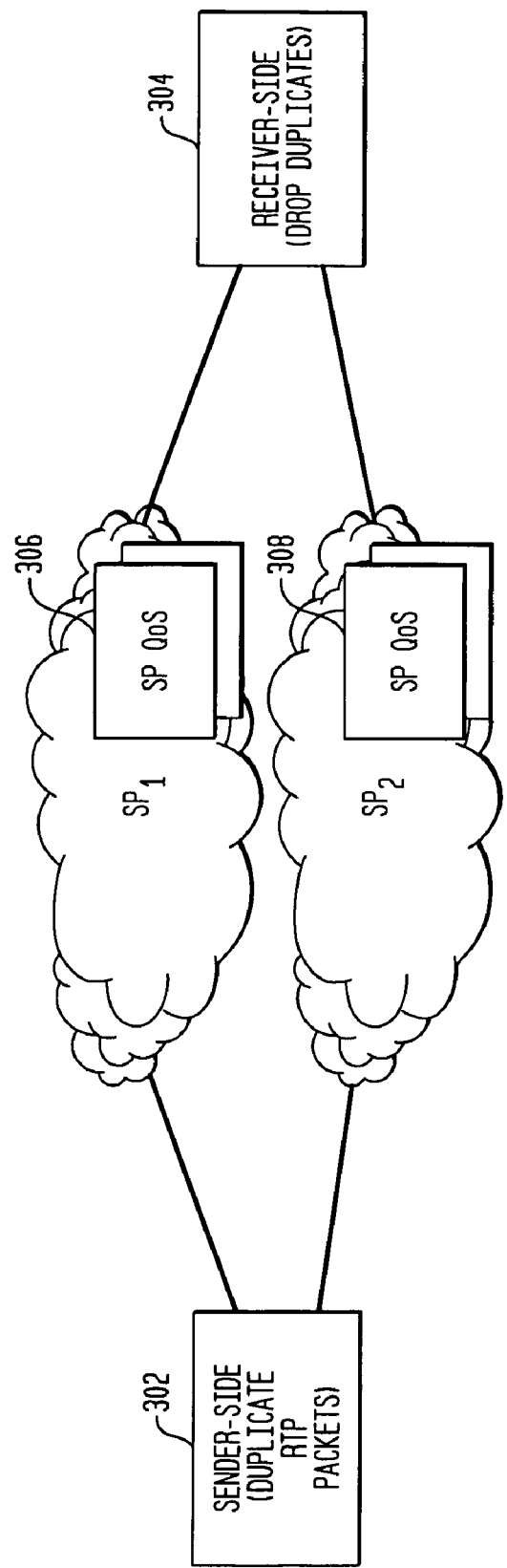
FIG. 3 illustrates a prototype implementation of an embodiment of the present invention.

Statistical benefits of the invention will now be discussed with respect to a prototype implementation of the invention. In this prototype the end hosts are standard off-the-shelf PCs running Windows 2000. Simple RTP senders and receivers running on the end hosts were built using the Java Media Framework. The network between the end-hosts was built using PCs running Linux as routers. The network implementation includes three main components as shown in FIG. 3. The first component is a module 302 that duplicates packets at the edge router and sends them over two "service providers," $SP_1$ and $SP_2$, where these two service providers' clouds are emulated with a set of PCs running Linux as routers. The second component are emulators 306 and 308 of service provider network QoS situations (i.e., delay, jitter and loss), which run on the PCs (routers) emulating the service providers. The third component is a module 304 on the receiver side edge router that drops duplicates. This third component can be turned on or off depending on the desired scenario. In particular, after traversing the service provider networks, one copy of the duplicates can be discarded at either the receiver-side edge router (if the third component is turned on) or at the receiver application.

A. Implementation of Components

The sender side module 302 duplicates RTP packets. It includes three tasks: 1) selecting packets for duplication, 2) making duplicates, and 3) forcing the duplicates to two service providers. In our reference implementation, packets are selected for duplication based on the destination port numbers (specific port ranges are used for RTP streams). In alternative embodiments of the invention this can be upgraded so that a signaling server informs the duplicating router about which streams are RTP streams needing duplication.

Figure 4:
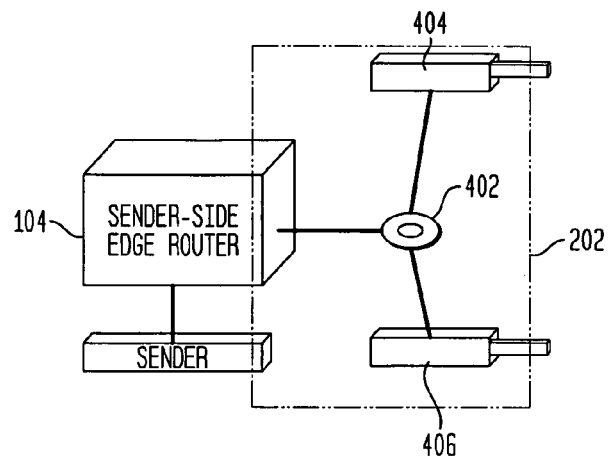
FIG. 4 illustrates additional detail of the prototype implementation of FIG. 3 wherein duplication occurs using MAC spoofing.

In alternative embodiments of the invention, duplicating packets and forcing the duplicates on different interfaces can be done using either a software or a hardware solution. The software solution is relatively more cumbersome and requires custom code—especially to force the packet to an interface other than one specified by the standard routing table. For the simulation and as depicted in FIG. 4, a hardware approach using off-the-shelf components was utilized. Further, instead of first selecting packets to be duplicated, all packets were duplicated and "unnecessary" ones were later filtered out. The duplication is done using a Layer-2 method with a standard hub 402 connected to two Linux routers 404 and 406. The MAC addresses on the interfaces of these two Linux routers connected to the hub are rewritten to be the same, so that both routers pick up the duplicates. For non-VoIP packets, duplicates are then dropped using Linux's iptables utility, which is well-known in the art. Notice that the MAC address spoofing in this case is not a security issue since it is conceptually inside the "duplication box". In particular, the dotted line represents duplicator 202 in FIG. 4. An alternative prototype implementation included a software version of the duplication box.

A well-known, freeware software "NIST Net" (available at the website address http://snad.ncsl.nist.gov/nistnet, and incorporated herein by reference) is used for the second components 306 and 308 that emulate service provider QoS characteristics based on input parameters.

At the receiving side 304, the duplicated packets can be dropped either at the edge router or at the receiver application. Based on the RTP protocol definition, the end-point applications should drop duplicates automatically. To reduce the usage of the receiving enterprise network's bandwidth, alternative embodiments of the invention have the receiver-side edge router drop the packets. In the simulation an enhancement was performed to the nistnet package for such a purpose. In this modification a cache was used to record packets that have already been received and identify duplicates using IP packet header and RTP sequence numbers. It should be noted that the reliability of such a software program and its potential fail-over is not a major concern, since the end-application can drop duplicates during the time program recovers and rebuilds its cache. Well known fault tolerance techniques can be used to ensure reliability of such a software program.

B. Experimental Results

From the above described prototype implementation it was observed that when emulating statistically independent losses between the two service providers, even high packet losses (of the order of 20% on each service provider) produced no noticeable loss of quality on a music stream to an average listener (this somewhat subjective conclusion was drawn by demonstrating the system and music segments to several randomly chosen listeners). Clearly, two independent service providers each having a loss of about 20% each only results in a net loss of about 4% (0.20×0.20). Clearly, even if one of the service providers has a high loss, the present invention improves the overall quality of the received information. Since most end-hosts will have smoothing capabilities, higher net losses could be tolerated.

It was observed that a small buffer size of 32 packets was sufficient to drop duplicates at the receiver-side edge router. Letting $\Delta t$ be the average differential delay between the two service provider paths, and letting the packetization interval be p, the receiver-side edge router should be able to buffer at least the average $1+\lceil \Delta t/p \rceil$ packets per stream, if it were to be configured to drop duplicates. To keep the packet-drop rate low, though, the buffer also has to be sized to incorporate the effects of variances in the differential delays. However, since Δt is expected to be small in practice, the required buffer size should still be relatively small. Notice also that for VoIP, excessively delayed packets can be disregarded, and any duplicates that slip through will be dealt with by the application.

Further, it was also observed that end-hosts worked reliably with duplicate packets, dropping the duplicates per RTP specifications (when the receiver-side edge router was configured to not drop duplicates).

II. Deployment Issues

In deploying the present invention in current enterprise networks, several issues need to be considered. In particular, one needs to consider how the invention will co-exist with other technologies currently in use in enterprise networks, like network address translators (NATs), firewalls, non-co-located connections to two service providers, etc.

The above described embodiments of the invention primarily addressed the connection to two service providers from one edge router (or two co-located edge routers). In such embodiments the invention can be connected to the output ports of the edge router(s), where it can duplicate relevant traffic, giving priority to non-duplicated traffic, per administrator-specified policies.

Additional embodiments of the invention can be policy-enabled to, e.g., use a certain fixed bandwidth for duplicated traffic, or give strict priority to non-duplicated traffic, thereby filling the unused portion of the bandwidth from the enterprise to the service provider with duplicated RTP traffic. In one embodiment of the invention duplication would occur after any NAT and firewall (from the point of view of the enterprise). It should be noted, however, that if the end terminals use only the RTP header information to identify the far end, the NAT-overwriting of IP headers may be irrelevant to the far end (except, maybe, to the far-end firewall). In such cases, alternative embodiments of the invention envision the duplication to occur before the NAT. Similar techniques used to open up firewall ports by signaling (e.g., SIP) servers can be used in the present invention to provide information as to which traffic to duplicate. Alternatively, known statistical techniques for detecting RTP streams can be used to detect RTP streams to subsequently start the duplication. Although service providers (SP) sometimes do source-IP based filtering, the SPs can open up filters for acceptable (non-private) IP addresses.

Figure 5:
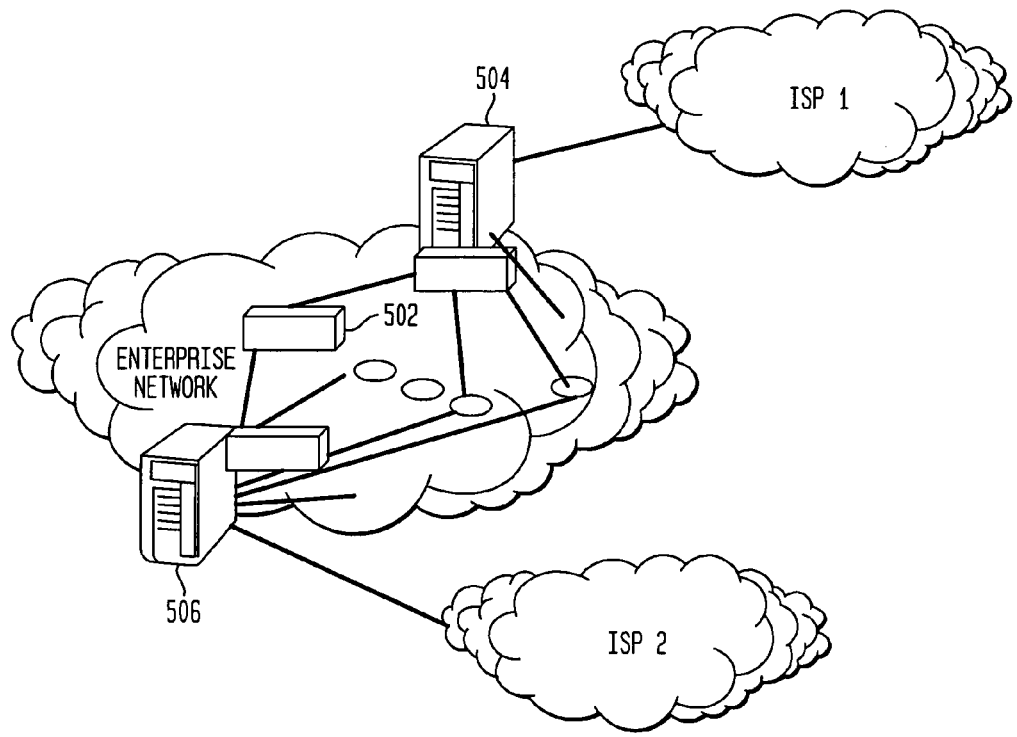
FIG. 5 illustrates an additional embodiment of the invention employed in a situation where edge routers are not co-located.

Additional embodiments of the invention address the situation in which the two routers connecting to the SPs are not co-located. This situation is depicted in FIG. 5. In this case, a tunneling based technique can be used. This scheme duplicates traffic further inside the enterprise networks at "interior" devices 502, and tunnels it to two gateway devices 504 and 506 that sit close to the edge routers. These gateway devices de-capsulate the packets and send them to the respective service providers. Note that some coarse-grained coordination between the two gateway devices may be helpful. Firewalls at the two egress points will also need to be opened up by the signaling server. Optimizations can be done where initial packets are tunneled and subsequent packets are sent with IP headers overwritten at the interior devices and re-written at the gateways 504 and 506 with regular caching of (some IP and RTP) header information.

In this embodiment of the invention, it is envisioned that the IP and RTP headers should be sufficient for dropping of duplicates mid-stream (e.g., at the receiver edge router).

III. Additional Embodiments

Of practical concern in implementing the present invention are the increased network bandwidth requirements resulting from transmitting duplicate packets. As noted above, this can simply be addressed be transmitting such duplicates only for certain types of data (e.g. VoIP). The following additional embodiments provide further means for reducing the amount of transmitted duplicates. It should be noted that in each of these embodiments, duplicates that are transmitted are still real-time traffic that may be retained in accordance with the embodiments of the invention discussed above (e.g. first packet to arrive)—the transmissions are not solely being used to determine the status of the network.

One such additional embodiment of the invention, which reduces the amount of transmitted duplicates, uses the duplicate packet transmission as a means of determining the status of both networks. One example of such an embodiment would be duplicating only a fraction of the packets, transmitting them, and comparing network delays (e.g. SP delays) to then make a determination as to which network to make "active". The second network may be then delegated to carrying occasional duplicates to monitor the relative delays and determine if and when the status should be changed, i.e. the second network replace the first as the "active" network.

In one further embodiment of this feature, bandwidth may be conserved by transmitting, for certain time periods, VoIP packets over just a single SP. During certain other time periods, VoIP packets are duplicated and sent over multiple SPs. During these periods of duplication, simple delay comparisons (e.g. determine which SP's packets arrived at the destination first) can be used to indicate the current best SP to use during the time periods that packets are not duplicated.

In such an embodiment, the receiver-side edge router 304 (which drops the duplicate packets) accumulates information as to relative delays of received packets and provides this information to the sender-side edge router 302 (which duplicates the packets). Such communication can be readily implemented over the IP network as is well-known in the art. This received information is then used by the sender-edge router to determine which network is to be utilized as the active network.

A further embodiment of the invention would maintain statistics of the delays encountered along various network paths or SPs. These statistics could be employed to make improvements in the performance of the enterprise network. For example, one might avoid data transmission using a particular SP during a time of day when it is noticed there is a consistent pattern of unusually bad performance. Moreover, with respect to a particular SP whose performance is found to be consistently poor, these statistics would lend support to demands for price concessions and/or improvements and even perhaps justification for permanent replacement with an alternative SP.

It is to be understood that the foregoing disclosure taught and described herein is illustrative of the present invention. Modifications may readily be devised by those ordinarily skilled in the art without departing from the spirit or scope of the present invention.

What is claimed is:

1. A method for transmitting real-time traffic on an Internet Protocol (IP) network from a signal origin point to a signal destination point, said traffic comprising a plurality of original data packets, the method comprising the steps of:
   (a) creating a duplicate data packet for at least some of said plurality of original data packets, thereby creating an original copy and a duplicate copy for at least some of said plurality of original data packets;

(b) transmitting said original data packets to the signal destination point along a first network path;

(c) transmitting at least some of said duplicate data packets to the signal destination point along a second network path wherein said second path differs from said first network path;

(d) determining periodically the status of the first and second network paths by comparing the delays of the data packets in the first and second network paths; and (e) selecting the network path having the least delay as the active network path.

2. The method of claim 1 wherein said traffic comprises VoIP.

3. The method of claim 1 wherein said IP network comprises a dual-homed enterprise network comprising a first service provider network and a second service provider network, wherein said first network path is at least partially within said first service provider network and said second network path is at least partially within said second service provider network.

4. The method of claim 1 wherein said first network path is over a first WAN and said second network path is over a second WAN.

5. The method of claim 1 wherein said network comprises a first tunnel and a second tunnel, each tunnel being provided by the same service provider, and said first network path is over said first tunnel and said second network path is over said second tunnel.

6. The method of claim 1 wherein the delay is determined by comparing the time of arrival for an original data packet transmitted along the first network path relative to time of arrival for a corresponding duplicate data packet transmitted along the second network path.

7. A system for transmitting real-time traffic on an Internet Protocol (IP) network from a signal origin point to a signal destination point, said traffic comprising a plurality of original data packets, the system comprising:

(a) means for creating a duplicate data packet for at least some of said plurality of original data packets, thereby creating an original copy and a duplicate copy for at least some of said plurality of original data packets;

(b) means for transmitting said original data packets to the signal destination point along a first network path;

(c) means for transmitting at least some of said duplicate data packets to the signal destination point along a second network path wherein said second path differs from said first network path;

(d) means for determining periodically the status of the first and second network paths by comparing the delays of the data packets in the first and second network paths; and (e) means for selecting the network path having the least delay as the active network path.

8. The system of claim 7 wherein said traffic comprises VoIP.

9. The system of claim 7 wherein said IP network comprises a dual-homed enterprise network comprising a first service provider network and a second service provider network, wherein said first network path is at least partially within said first service provider network and said second network path is at least partially within said second service provider network.

10. The system of claim 7 wherein said first network path is over a first WAN and said second network path is over a second WAN.

11. The system of claim 7 wherein said network comprises a first tunnel and a second tunnel, each tunnel being provided by the same service provider, and said first network path is over said first tunnel and said second network path is over said second tunnel.

12. The system of claim 7 wherein the delay is determined by comparing the time of arrival for an original data packet transmitted along the first network path relative to time of arrival for a corresponding duplicate data packet transmitted along the second network path.

* * * * *